United States Patent Office 3,148,192
Patented Sept. 8, 1964

3,148,192
HALOGENATED 20α-YOHIMBANE COMPOUNDS
Leon Velluz, Paris, Georges Muller, Nogent-sur-Marne, Seine, Gerard Nomine, Noisy-le-Sec, Seine, Lucien Penasse, Paris, and Andre Pierdet, Noisy-le-Sec, Seine, France, assignors, by mesne assignments, to Roussel UCLAF, S.A., Paris, France, a corporation of France
No Drawing. Filed June 27, 1961, Ser. No. 119,787
Claims priority, application France, Aug. 14, 1957, 745,-546; Oct. 21, 1957, 749,826; Oct. 24, 1957, 750,144; Dec. 26, 1957, 754,638, Patent 1,189,010; Jan. 3, 1958, 755,106; Jan. 17, 1958, 756,117
3 Claims. (Cl. 260—287)

The present invention relates to new and valuable 20α-yohimbane compounds and more particularly to halogenated 20α-yohimbane compounds of the reserpine series and to processes of preparing the same.

In particular, this invention relates to halogenated deserpidines of the structural formula:

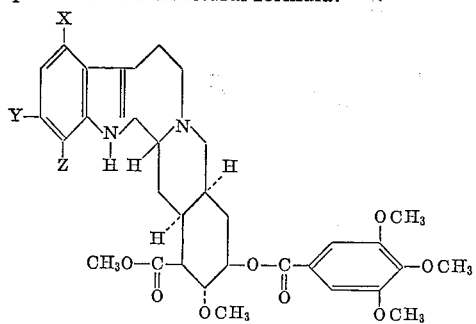

wherein X and Y are substituents different from each other and selected from the group consisting of hydrogen and chlorine and Z is selected from the group consisting of chlorine and methoxy, with the proviso that when X is chlorine, Z is methoxy, and to processes of preparing the same.

20α-yohimbane compounds of the reserpine series are of considerable interest of physiologically active compounds having noteworthy pharmacodynamic properties. In particular, such compounds are of considerable interest as hypotensive agents. Levorotatory (chloroform) 11,12-dichloro-deserpidine, levorotatory (chloroform) 9-chloro-12-methoxy deserpidine and levorotatory (chloroform) 11-chloro-12-methoxy deserpidine are physiologically active products of the reserpine family and possess interesting pharmacodynamic properties, their hypotensive action is similar to that of reserpine but they are almost completely without a depressor effect on the central nervous system as compared with reserpine.

This application is a continuation-in-part of Serial No. 727,777, filed April 11, 1958, now abandoned.

It is an object of the present invention to obtain new and valuable halogenated 20α-yohimbanes of the reserpine series having valuable properties.

Another object of the invention is to obtain levorotatory (chloroform) halogenated deserpidine of the structural formula:

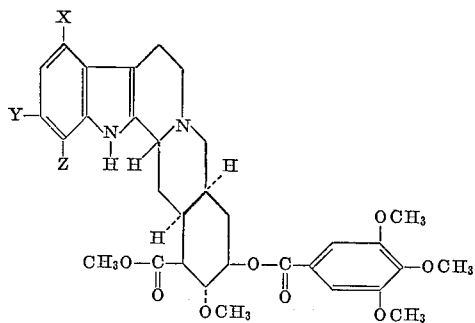

wherein X and Y are substituents different from each other and selected from the group consisting of hydrogen and chlorine and Z is selected from the group consisting of chlorine and methoxy, with the proviso that when X is chlorine, Z is methoxy.

A further object of the invention is to provide simple and effective processes of preparing halogenated deserpidines of the structural formula:

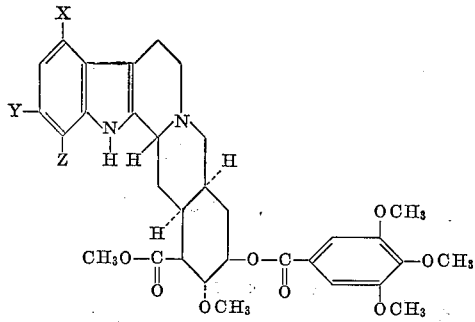

wherein X and Y are substituents different from each other and selected from the group consisting of hydrogen and chlorine and Z is selected from the group consisting of chlorine and methoxy, with the proviso that when X is chlorine, Z is methoxy.

A still further object of the invention is to obtain new intermediates useful in the preparation of said halogenated deserpidines.

These and other objects of the invention will become more apparent as the description thereof proceeds.

In principle, the present invention relates to the levorotatory (chloroform) halogenated deserpidine compounds of Formula I:

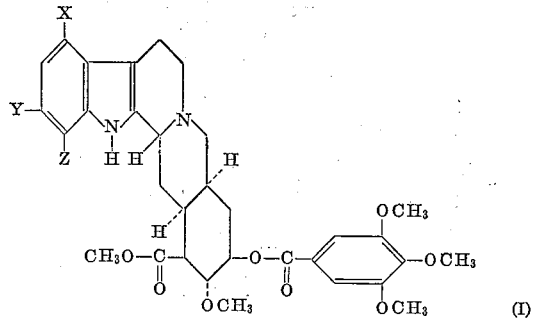
(I)

wherein X and Y are substituents different from each other and selected from the group consisting of hydrogen and chlorine and Z is selected from the group consisting of chlorine and methoxy, with the proviso that when X is chlorine, Z is methoxy, as new industrial compounds.

Levorotatory 11,12-dichloro-deserpidine has a melting point towards 160° C. then at 222° C., a specific rotation of $[\alpha]_D^{20} = -97° \pm 5°$ (c.=0.5% in chloroform), is soluble in acetone, benzene and chloroform, slightly soluble in alcohol and insoluble in ether. It is solvated with one-half mol of water.

Levorotatory 9-chloro-12-methoxy deserpidine has a specific rotation of $[\alpha]_D^{20} = -132° \pm 10°$ (c.=0.25% in chloroform), is soluble in aqueous methanol and insoluble in ether.

Levorotatory 11-chloro-12-methoxy deserpidine has a melting point of 183° C., a specific rotation of $[\alpha]_D^{20} = -129° \pm 5°$ (c.=0.5% in chloroform), is soluble in acetone, chloroform and methanol, insoluble in ether and water, recrystallizable from aqueous acetone and is hygroscopic.

The compounds of the invention are prepared according to the reaction scheme of Table I. Table I is a flow diagram showing the alternate methods of producing halogenated deserpidines starting from halogenated tryptamines (Formula III) and the methyl ester of 1β-carboxy methyl-2β-methoxy carbonyl-3α-methoxy-4β-acetoxy-6β-formyl cyclohexane (Formula II). This latter compound II, can be utilized either in the form of its racemate to produce a racemic halogenated deserpidine or in the form of one of its optical antipodes to produce an optically active halogenated deserpidine and especially the levorotatory halogenated deserpidines.

The methyl ester of 1β-carboxy methyl-2β-methoxy carbonyl - 3α - methoxy - 4β - acetoxy - 6β - formyl cyclohexane is preferably prepared according to United States Patent 2,971,978 entitled "Process Of Producing 1β - Carboxymethyl-2β-Methoxycarbonyl-3α-Methoxy-4β-Acetoxy-6β-Formyl Cyclohexane."

The halogenated tryptamines are obtained according to the reaction scheme of Table II.

TABLE I

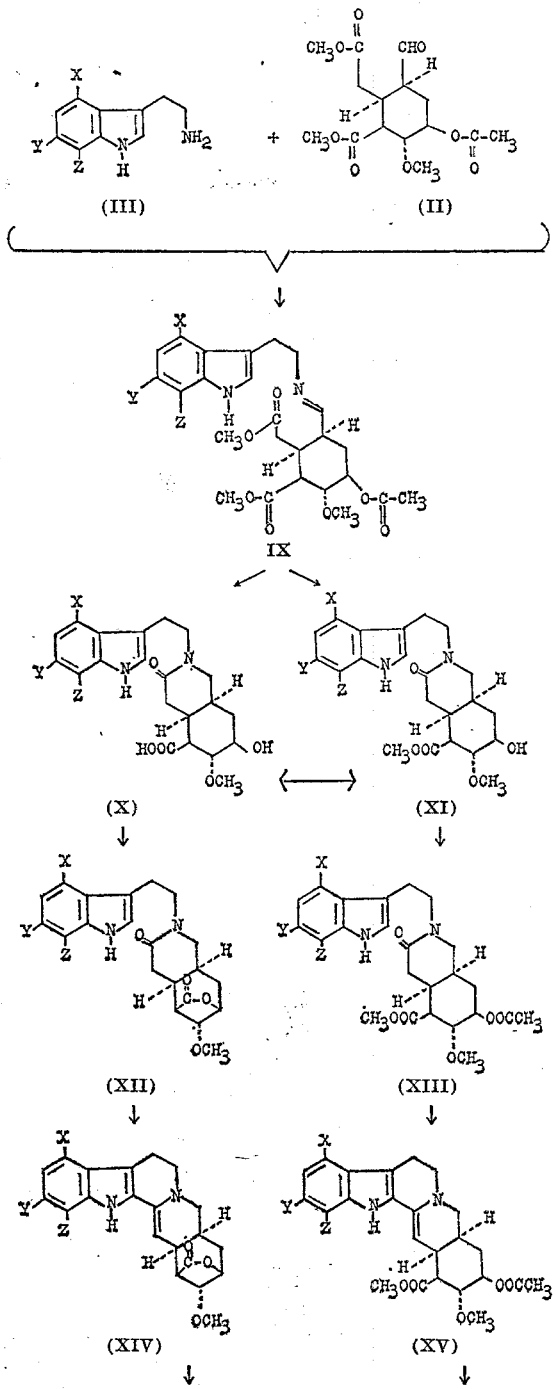

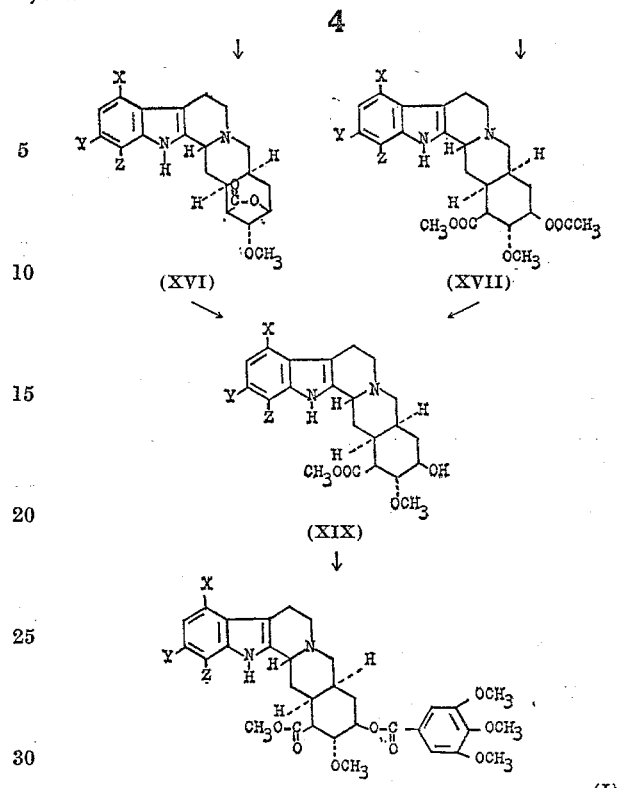

(I)

wherein X, Y and Z have the values assigned above.

Condensation of the substituted tryptamine compound of Formula III with the monocyclic aldehyde of Formula II is preferably carried out in a neutral solvent, such as methylene chloride or tetrahydrofuran, at about room temperature. Thereby a compound of Formula IX is obtained:

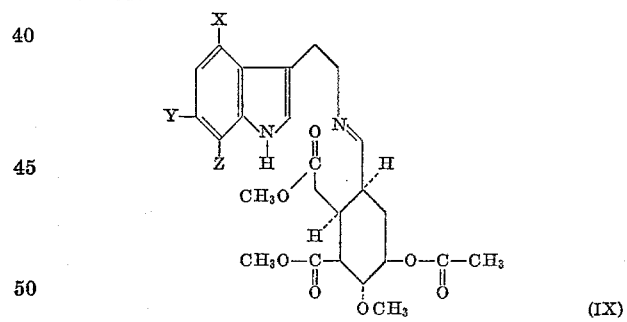

wherein X, Y and Z have the values assigned above. The compound of Formula IX is subjected to the action of an alkali-metal borohydride such as potassium borohydride in the presence of a lower alcohol such as methanol at elevated temperatures whereby the double bond of the Schiff base of Formula IX is hydrogenated, ring closure takes place and the compound is partially saponified. Thereby the compound of Formula XI is obtained:

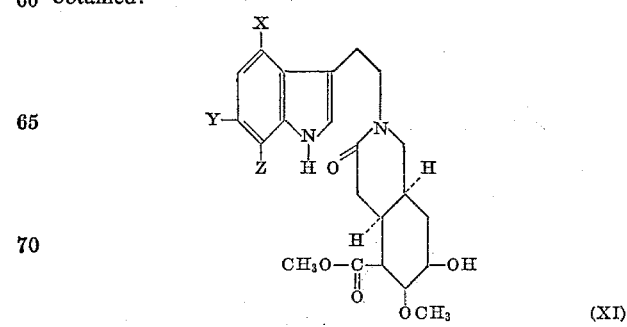

wherein X, Y and Z have the above assigned values.

In the event that the 18β-hydroxy yohimbane compound of Formula XI can be crystallized with difficulty only, saponification may be completed by the addition of an aqueous alkali metal hydroxide solution. Thereby, the compound of Formula X is obtained:

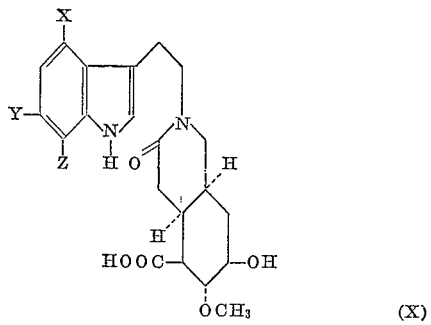

wherein X, Y and Z have the above assigned values. The carboxyl group of the compound of Formula X may be esterified by means of diazomethane according to known methods. In this manner it is possible to prepare Compound XI from Compound X.

By one mode of execution of the process, the compound of Formula X is lactonized by the action of acetic acid anhydride in the presence of an alkali metal acetate to give a 16–18 lactone haping the Formula XII in Table I. This halogenated 16–18 lactone of Formula XII is cyclized by refluxing with a cyclizing agent such as phosphorus oxychloride or thionyl chloride and after treatment with aqueous ammonia in an inert organic solvent such as acetone, the 16–18 lactone of Formula XIV is recovered. The $\Delta^{3(14)}$,16–18 lactone of Formula XIV is reduced to the corresponding 3β,16–18 lactone of Formula XVI, either by treatment with a mixed metal hydride such as an alkali metal borohydride in a lower alkanol such as methanol and subsequent isomerization of the levorotatory 3α-isomer formed into the dextrorotatory 3β-isomer by action of hot formic acid, or by stereoselective hydrogenation by action of zinc and acetic acid. The 3β,16–18 lactone of Formula XVI is transformed by methanolysis with sodium methylate into the corresponding methyl ester of Formula XIX.

By another mode of execution of the process, the compound of Formula XI is reacetylated by action of acetic acid anhydride to give the 3-oxo-2,3-seco compound of Formula XIII. This latter compound is cyclized under the conditions indicated above to give a $\Delta^{3(14)}$ compound of Formula XV which is reduced under the conditions indicated above to give the 3β-isomer of Formula XVII. The 3β-isomer of Formula XVII is partially saponified by the action of a mixed metal hydride such as potassium borohydride in a lower alkanol such as methanol at reflux temperatures to give the corresponding methyl ester of Formula XIX.

The compound of Formula XIX is then esterified by means of a 3,4,5-trimethoxy benzoic acid derivative such as the chloride or anhydride. When the anhydride is utilized it is preferably reacted in the presence of a pyridine base and of triethylamine according to the method described in United States Patent 2,926,167. The desired ester of Formula I is obtained:

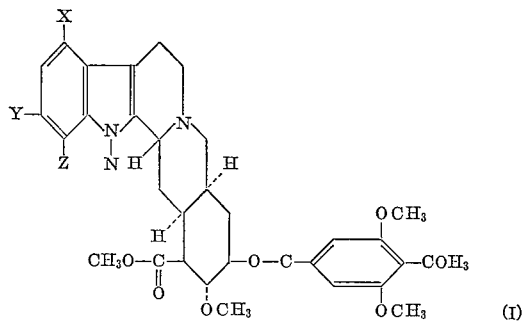

wherein X, Y and Z have the meanings assigned above.

The halogenated tryptamines of Formula III are prepared according to the reaction scheme of Table II.

TABLE II

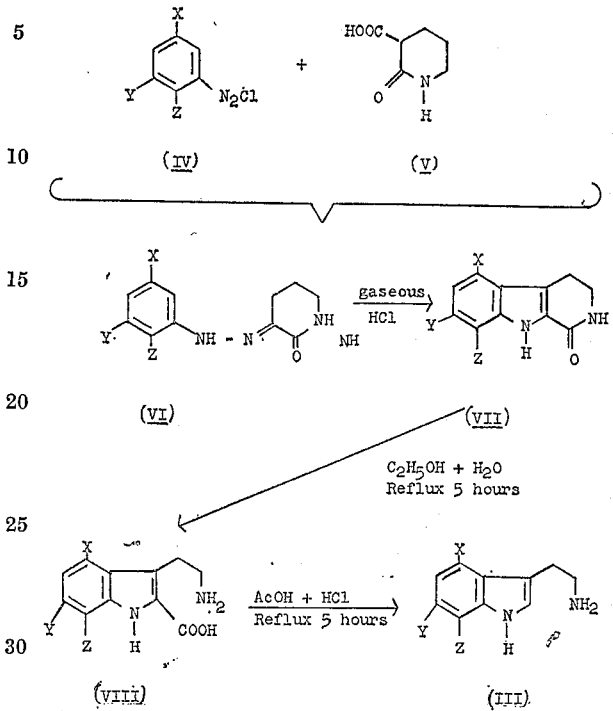

wherein X, Y and Z have the values assigned above.

The halogenated tryptamine compounds of Formula III are preferably prepared by condensing a diazonium salt of a suitably substituted aniline compound of Formula IV with an alkali metal salt, such as the potassium salt, of 2-piperidone-3-carboxylic acid of Formula V causing ring closure of the resulting substituted 3-phenyl hydrazone of 2,3-dioxo piperidine of Formula VI to the corresponding 1,2,3,4-tetrahydro-1-oxo-β-carboline of Formula VII, and finally saponifying and decarboxylating said compound.

The following examples serve to illustrate the present invention without, however, limiting the same thereto. More particularly, many changes and variations in the reaction temperature and duration, in the nature of the solvents, acids and bases used, in the order of introducing the reaction components into the reaction vessel, in the mode of working up the reaction mixture, and of isolating and purifying the reaction product may be made by those skilled in the art in accordance with the principles set forth herein and in the claims annexed hereto.

The melting points given in the examples are instantaneous melting points determined on the Maquenne block.

*Example I*

PREPARATION OF 6,7-DICHLORO TRYPTAMINE
[III; X=H, Y=Z=Cl]

100 gm. of 2,3-dichloro aniline are dissolved in dilute hydrochloric acid, the solution is cooled, and 43 gm. of sodium nitrite, dissolved in 200 cc. of water and mixed with 200 gm. of ice, are added.

The solution of the potassium salt of 3-carboxy-2-piperidone, prepared by saponification of 105 gm. of 3-carbethoxy-2-piperidone by means of aqueous potassium hydroxide solution, are added to the solution of the diazonium salt at 0° C. The pH value of the reaction mixture is adjusted to a pH of 4.0 to 5.0 by the addition of a solution of sodium acetate. The mixture is stirred at 0° C. for 6 hours and is allowed to stand in the ice box overnight. The precipitated phenyl hydrazone of Formula VI is filtered with suction, washed with water and dried. The yield is 150 gm. (89% of the theoretical amount) of a crude product which is purified by successive recrystallization from methanol and acetone.

The 2,3-dioxo piperidine-3-(6',7'-dichloro)phenyl hydrazone melts at 233–236° C. and crystallizes in the form of yellow-orange crystals which are soluble in methanol and hot acetone and insoluble in water, dilute acids, and dilute aqueous alkali metal hydroxide solutions.

Analysis.—$C_{11}H_{11}ON_3Cl_2$; molecular weight: 272.13. Calculated: C, 48.55%; H, 4.08%; N, 15.44%; Cl, 26.06%; O, 5.87%. Found: C, 48.2%; H, 4.10%; N, 15.3%; Cl, 25.8%; O, 6.4%.

In order to cause ring closure, 10 gm. of said phenyl hydrazone are dissolved in 40 cc. of acetic acid. Solution is achieved by gentle heating. After the addition of 40 cc. of hydrochloric acid, the reaction mixture is refluxed for 20 minutes, cooled, and allowed to stand in an ice bath for 2 hours. The precipitated compound is then filtered with suction. It is washed successively with a mixture of dilute hydrochloric acid and acetic acid, water, ammonia, and again with water. After drying 6.5 gm. (70% of the theoretical amount) of the carboline compound of Formula VII are obtained. Said compound is purified by recrystallization from isopropanol.

The 7,8 - dichloro - 1,2,3,4 - tetrahydro - 1 - oxo - β-carboline so obtained melts at 280° C. and is soluble in hot alcohol and insoluble in water.

Analysis.—$C_{11}H_8ON_2Cl_2$; molecular weight: 255.10. Calculated: C, 51.78%; H, 3.16%; N, 10.38%; Cl, 27.79%. Found: C, 51.1%; H, 3.1%; N, 10.7%; Cl, 28.1%.

10 gm. of said carboline compound are heated under reflux in a solution of 27 gm. of potassium hydroxide in 100 cc. of water and 150 cc. of ethanol for 15 hours. The alcohol is removed by distillation in a vacuum. The reaction mixture is then cooled and water is added. The precipitated compound is filtered with suction. The pH value of the filtrate is adjusted to a pH of 4.0 to 4.5 by the addition of acetic acid. After stirring for 1 hour, the precipitate is filtered with suction, washed with water, and dried. The yield is 10.7 gm. (100% of the theoretical amount). The carboxylic acid of Formula VIII may be used without further purification for the following reaction steps. For analysis it is purified by recrystallization from acetic acid.

The 6,7-dichloro tryptamine-2-carboxylic acid melts at 300–310° C. with decomposition and is insoluble in most organic solvents, and soluble in 1500 parts by volume of boiling water.

Analysis.—$C_{11}H_{10}O_2N_2Cl_2$; molecular weight: 273.12. Calculated: C, 48.37%; H, 3.69%; O, 11.72%; N, 10.26%; Cl, 25.96%. Found: C, 48.1%; H, 3.8%; O, 12.1%; N, 10.0%; Cl, 26.2%.

The infrared spectra confirms the structure indicated by Formula VIII. The compound is not described in the literature.

To split off the carboxyl group of said 6,7-dichloro tryptamine-2-carboxylic acid, 10 gm. are mixed with 300 cc. of acetic acid and 600 cc. of hydrochloric acid. The reaction mixture is refluxed for 10 hours, cooled, and mixed with water. After the addition of aqueous sodium hydroxide solution until a pH value of 12.0 is obtained, the mixture is extracted by means of chloroform. The extracts are washed with water, dried, and evaporated to dryness in a vacuum. 6.8 gm. (78% of the theoretical amount) of 6,7-dichloro tryptamine of Formula III are obtained. Said compound is purified by recrystallization first from benzene and then from cyclohexane.

6,7-dichloro tryptamine, which has not yet been described in the literature, has a melting point of 101° C. and crystallizes in the form of white needles which are soluble in alcohol, ether, benzene, chloroform, and cyclohexane, and insoluble in water.

Analysis.—$C_{10}H_{10}N_2Cl_2$; molecular weight: 229.11. Calculated: C, 52.42%; H, 4.39%; N, 12.23%; Cl, 30.95%. Found: C, 52.6%; H, 4.4%; N, 12.4%; Cl, 31.0%.

*Example II*

PREPARATION OF 11,12-DICHLORO DESERPIDINE
[I, X=H, Y=Z=Cl]

*Step A: The Methyl Ester of 18α-Acetoxy-11,12-Dichloro-17α - Methoxy - 16β-Methoxy Carbonyl - 2,3 - 3,4 - Diseco-$\Delta^{4(21)}$,20α-Yohimbene-3-Carboxylic Acid*

1.8 gm. of dextrorotatory (pyridine) 1β-carboxy methyl - 2β - methoxy carbonyl - 3α - methoxy - 4β - acetoxy-6β-formyl cyclohexane are subjected to the action of diazomethane in methylene chloride solution. The reaction mixture is concentrated to a volume of about 10 cc. 1 gm. of 6,7-dichloro tryptamine obtained according to Example I is added thereto. The reaction mixture is allowed to stand at room temperature for 15 minutes. The resulting compound which is new, is directly used without isolation for the next reaction step.

*Step B: 11,12-Dichloro-18β-Hydroxy-17α-Methoxy-16β-Methoxy Carbonyl-3-Oxo-2,3-Seco-20α-Yohimbane*

The methyl ester compound obtained as described in Step A from 1 gm. of 6,7-dichloro tryptamine is dissolved in 10 cc. of methylene chloride and the solution is mixed with 20 cc. of methanol and 500 mg. of potassium borohydride are added thereto. The reaction mixture is allowed to stand at room temperature for half an hour. After removal of the methylene chloride by distillation, the remaining solution is refluxed for one hour. The desired compound starts to crystallize towards the end of the reaction. Crystallization is completed by the addition of water. The crystals are filtered with suction, washed with aqueous methanol and water, dried, and recrystallized from a mixture of acetone and ether. The yield of the desired compound is 1.6 (78% of the theoretical amount) calculated for the tryptamine compound used as starting material.

The 11,12 - dichloro - 16β - methoxy carbonyl - 17α-methoxy - 18β - hydroxy-3-oxo-2,3-seco-20α-yohimbane so obtained melts at 240° C., has a rotatory power of $[\alpha]_D^{20}=+34°$ (concentration: 0.5% in pyridine), and is soluble in acetone, slightly soluble in chloroform, and insoluble in ether. The compound has not yet been described in the literature.

Analysis.—$C_{22}H_{28}O_5N_2Cl_2$; molecular weight: 469.36. Calculated: C, 56.30%; H, 5.58%; O, 17.04%; N, 5.97%; Cl, 15.11%. Found: C, 56.4%; H, 5.7%; O, 17.1%; N, 6.0%; Cl, 14.9%.

*Step C: Preparation of Dextrorotatory 18β-Acetoxy-11,12-Dichloro-17α - Methoxy-16β - Methoxy Carbonyl-3-Oxo-2,3-Seco-20α-Yohimbane (XIII; X=H, Y=Z=Cl)*

To 1.6 gm. of the compound obtained according to the preceding Step B is added 6.4 cc. of pyridine and 4 cc. of acetic acid anhydride. The solution is maintained for 15 minutes at 70° C. and next distilled to dryness under vacuum. The residue, after being taken up with ether, supplies crystals of 18β-acetoxy-11,12-dichloro-17α-methoxy - 16β - methoxy carbonyl - 3 - oxo - 2,3 - seco-20α-yohimbane (XIII) which are vacuum filtered, washed and dried. For analysis the product is recrystallized from a mixture of acetone and ether.

The 18β-acetoxy-11,12-dichloro-16β-methoxy carbonyl-17α-methoxy-3-oxo-2,3-seco-20α-yohimbane has a melting point of 180° C. and a rotatory power of $$[\alpha]_D^{20}=+7°\pm5°$$

(concentration: 0.5% in pyridine). It is soluble in chloroform and insoluble in ether and benzene.

Analysis.—$C_{24}H_{28}O_6N_2Cl_2$; molecular weight: 511.40. Calculated: C, 56.36%; H, 5.52%; N, 5.48%; Cl, 13.87%. Found: C, 56.4%; H, 5.6%; N, 5.5%; Cl, 13.8%.

*Step D: Preparation of 18β-Acetoxy-11,12-Dichloro-17α-Methoxy-16β-Methoxy Carbonyl-$\Delta^{3(14)}$-20α-Yohimbene (XV; X=H, Y=Z=Cl)*

3 gm. of dextrorotatory 18β-acetoxy-11,12-dichloro-

17α-methoxy-16β-methoxy carbonyl-3-oxo-2,3-seco-20α-yohimbane, obtained according to Step C and 6 cc. of phosphorus oxychloride are heated to reflux for a period of 2 hours. The reaction mixture is next distilled to dryness under vacuum. The residue is taken up in acetone, iced and concentrated ammonia solution is added until the pH reaches 10. Then water is added and crystallization is initiated by scratching. The mixture is iced, vacuum filtered and the crystals are washed with water and dried in order to recover 2.56 gm. (being a yield of 89%) of a clear yellow product comprising 18β-acetoxy-11,12-dichloro-17α-methoxy-16β-methoxy carbonyl-$\Delta^{3(14)}$-20α-yohimbene which melts around 300° C. The product is recrystallized from mixed ethyl acetate and ether. This compound is soluble in acetone and chloroform and insoluble in ether. The infrared spectra confirms the indicated structure. This compound is not described in the literature.

Analysis.—$C_{24}H_{26}O_5N_2Cl_2$; molecular weight: 493.37. Calculated: C, 58.42%; H, 5.31%; N, 5.68%; Cl, 14.37%. Found: C, 58.2%; H, 5.3%; N, 5.8%; Cl, 14.5%.

Step E: Preparation of Levorotatory 18β-Acetoxy-11,12-Dichloro-17α-Methoxy-16β-Methoxy Carbonyl-3α,20α-Yohimbane 100 mg. of the compound of Formula XV (X=H, Y=Z=Cl) obtained in Step D is dissolved in 3 cc. of methanol and 0.3 cc. of 2 N hydrochloric acid. Potassium borohydride is added until the pH reaches 10, without allowing the temperature to rise above 5° C. Towards the end of the addition of the borohydride, the 18β-acetoxy-11,12-dichloro17α-methoxy-16β-methoxy carbonyl-3α,20α-yohimbane product crystallizes. 6 cc. of water is added and the mixture iced, the crystals are vacuum filtered, washed and dried. Yield: 83 mg. (83%) of crystals which are soluble in acetone, methylene chloride and chloroform, insoluble in ether and water, melt at 236° C. and have a specific rotation $[\alpha]_D^{20}=-202°\pm5$ (c.=0.5% in pyridine). The infrared spectra is in accord with the indicated structure and in particular confirms the 3α-configuration. This compound is not described in the literature.

Step F: Preparation of Levorotatory 18β-Acetoxy-11,12-Dichloro-17α-Methoxy-16β-Methoxy Carbonyl-3β,20α-Yohimbane (XVII; X=H, Y=Z=Cl)

16.6 gm. of zinc powder are introduced into a mixture containing 8.34 gm. of 18β-acetoxy-11,12-dichloro-17α-methoxy-16β-methoxy carbonyl-$\Delta^{3(14)}$-20α-yohimbene, prepared according to Step D, 83 cc. of acetone, 8.3 cc. of 65% perchloric acid, 75 cc. of water and 0.83 cc. of a solution of 45° Bé. ferric chloride. The reaction mixture is heated to reflux with agitation for a period of a half hour. The zinc is vacuum filtered and the acetone is distilled. The perchlorate of 18β-acetoxy-11,12-dichloro-17α-methoxy-16β-methoxy carbonyl-3β,20α-yohimbane precipitates in the form of a gum. The gum is decanted and washed with water. It is taken up in 100 cc. of ammoniacal water having a pH of 10 and a mixture of methylene chloride and methanol (3:1) is added. Extraction by organic solvents is very difficult. There are required several extractions with a total of 1 liter of solvents. The extracts are combined and distilled to dryness under vacuum. The residue is taken up in 40 cc. of methylene chloride in which the 3α-isomer is soluble. The product is vacuum filtered, dried and 3.08 gm. (36%) of crystals of a compound of Formula XVII (X=H, Y=Z=Cl) are obtained. These crystals sublime above 300° C. and melt on the Maquenne block at 341° C., have a specific rotation $[\alpha]_D^{20}=-77°$ (c.=0.5% in pyridine). The new compound, insoluble in all usual organic solvents, is dissolved in an acidic media.

Analysis.—$C_{24}H_{28}O_5N_2Cl_2$; molecular weight: 495.39. Calculated: C, 58.18%; H, 5.69%; N, 5.65%; Cl, 14.3%. Found: C, 58.0%; H, 5.6%; N, 5.7%; Cl, 14.4%.

Step G: Preparation of Levorotatory 11,12-Dichloro-18β-Hydroxy-17α-Methoxy-16β-Methoxy Carbonyl-3β,20α-Yohimbane (XIX; X=H, Y=Z=Cl)

3.08 gm. of 18β-acetoxy-11,12-dichloro-17α-methoxy-16β-methoxy carbonyl-3β,20α-yohimbane, prepared according to Step F, 185 cc. of methanol, 92 cc. of tetrahydrofuran and 1.25 gm. of potassium borohydride are heated to reflux for a period of 24 hours. The reaction mixture is then concentrated to 20 cc., poured in cold water and extracted with methylene chloride. The extracts are combined, distilled to dryness under vacuum and supply a residue which, on being taken up in ether, crystallizes. The crystals are vacuum filtered, washed with ether and dried. 2.37 gm. (84%) of 11,12-dichloro-18β-hydroxy-17α-methoxy-16β-methoxy carbonyl-3β,20α-yohimbane are recovered, having a melting point of 256° C. and a specific rotation $[\alpha]_D^{20}=-73°\pm5$ (c.=0.5% in pyridine). The product is in the form of fine needles, it is soluble in alcohol, acetone, benzene and chloroform, very slightly soluble in ether. The infrared spectrum confirms the indicated structure. The compound is not described in the literature.

Analysis.—$C_{22}H_{26}O_4N_2Cl_2$; molecular weight: 453.36. Calculated: C, 58.28%; H, 5.78%; N, 6.18%; Cl, 15.64%. Found: C, 58.5%; H, 5.8%; N, 6.1%; Cl, 15.6%.

Step H: Preparation of Levorotatory 11,12-Dichloro Deserpidine (I; X=H, Y=Z=Cl)

A mixture of 2 gm. of 11,12-dichloro-18β-hydroxy-17α-methoxy-16β-methoxy carbonyl-3β,20α-yohimbane, prepared according to Step G, with 20 cc. of pyridine and 4.5 gm. of 3,4,5-trimethoxybenzoyl chloride are heated for a period of 18 hours at 75° C. in a sealed tube under an atmosphere of nitrogen. After addition of 5 cc. of water, the reaction mixture is allowed to stand for a period of a half hour at 40° C., then it is poured on ice and acidified with sulfuric acid. The reaction mixture is extracted with methylene chloride. The extracts are combined and washed with water, then with an ammoniacal solution, and again with water, agitated several minutes with 10 gm. of alumina and distilled to dryness under vacuum. The residue is taken up in methanol and, on addition of nitric acid, the nitrate crystallizes on scratching. The crystals are vacuum filtered, washed with methanol and placed in suspension in acetone. Excess ammonia water is added, then water is added until the appearance of a turbidity. The compound crystallizes and, after vacuum filtering, washing with water and drying, 2.28 gm. (79%) of 11,12-dichloro deserpidine is obtained, which is recrystallized from aqueous acetone. The compound, which has not yet been described in the literature, melts at about 160° C., solidifies again, and finally melts at 222° C. It has a specific rotation of $[\alpha]_D^{20}=-97°\pm5°$ (concentration: 0.5% in chloroform). It crystallizes with half a molecule of water in the form of fine needles which are soluble in acetone, benzene and chloroform, slightly soluble in alcohol, and insoluble in ether.

Analysis.—$C_{32}H_{36}O_8N_2Cl_2$; molecular weight: 647.54. Calculated: C, 59.35%; H, 5.60%; N, 4.33%; Cl, 10.95%. Found: C, 59.3%; H, 5.6%; N, 4.5%; Cl, 10.9%.

The infrared spectrum confirms the indicated structure.

*Example III*

PREPARATION OF 4-CHLORO-7-METHOXY-TRYPTAMINE
[III; X=Cl, Y=H, Z=OCH₃]

6.45 gm. of 4-chloro-o-anisidine are diazotized in dilute hydrochloric acid between 0° C. and +5° C. by means of 3.6 gm. of sodium nitrite. A solution of the potassium salt of 3-carboxy-2-piperidone, prepared by saponification of 6.8 gm. of 3-carbethoxy-2-piperidone by means of aqueous potassium hydroxide solution, are added to a solution of the diazonium salt at 0° C. within 15 minutes. The pH value of the reaction mixture is adjusted to a pH of 3.5 to 4.0 by the addition of acetic acid. The mixture is stirred while kept in an ice bath for 6 hours and is allowed to stand at a temperature between 0° C. and +5° C. overnight. The precipitated phenyl hydrazone compound of Formula VI is filtered with suction, washed with water, and dried in a vacuum for 10 hours. The yield of crude product is 9.5 gm. (86% of the theoretical amount). It is purified by recrystallization from ethanol.

The 2,3-dioxo piperidine-3-(5'-chloro-2'-methoxy)-phenyl hydrazone melts at 171–172° C. and is insoluble in water and soluble in absolute or dilute alcohol.

*Analysis.*—$C_{12}H_{14}O_2N_3Cl$; molecular weight: 267.7. Calculated: C, 53.83%; H, 5.27%; O, 11.96%; N, 15.69%; Cl, 13.24%. Found: C, 54.0%; H, 5.4%; O, 12.3%; N, 15.4%; Cl, 13.2%.

To cause ring closure, 50 gm. of said phenyl hydrazone are dissolved in 1200 cc. of methanol. Gaseous hydrochloric acid is passed through the mixture for half an hour while refluxing. After cooling, the mixture is evaporated to dryness in a vacuum. The resulting residue is taken up with water and the suspension is filtered with suction. The resulting residue is triturated with ammonia, washed with water, and dried in an oven. 31.5 gm. (67% of the theoretical amount) of 5-chloro-8-methoxy-1,2,3,4-tetrahydro-1-oxo-β-carboline of Formula VII are obtained. The product is crystallized from methanol. The compound melts at 210–211° C. and is soluble in alcohol and insoluble in water.

*Analysis.*—$C_{12}H_{11}O_2N_2Cl$; molecular weight: 250.68. Calculated: C, 57.50%; H, 4.42%; O, 12.77%; N, 11.18%; Cl, 14.15%. Found: C, 57.4%; H, 4.6%; O, 13.1%; N, 11.0%; Cl, 13.5%.

4 gm. of the carboline compound, prepared as described hereinabove, are refluxed in an alcoholic solution of 11 gm. of potassium hydroxide for 5 hours. The mixture is evaporated to dryness in a vacuum, the residue is dissolved in water, and the resulting solution is cooled in an ice bath and is acidified by the addition of acetic acid while stirring. The precipitated 4-chloro-7-methoxy tryptamine-2-carboxylic acid of Formula VIII is filtered with suction, washed with water, and dried for 12 hours. 4.1 gm. (100% of the theoretical amount) of a white amorphous product, very slightly soluble in organic solvents and melting at about 200° C. with decomposition, are obtained.

57 gm. of said carboxylic acid are dissolved in 1300 cc. of acetic acid at a temperature of 50–60° C. 1300 cc. of hydrochloric acid are added with stirring, whereby the carboxylic acid is precipitated. The mixture is refluxed for 4 hours while stirring. The purple color of the solution changes during refluxing to a violet color indicating the end of the reaction. After cooling and separating the precipitated unreacted carboxylic acid, the reaction mixture is neutralized by the addition of aqueous sodium hydroxide solution and extracted by means of ether. The ethereal solutions are washed with water and saturated with sodium chloride. After drying and distillation in a vacuum, 23.1 gm. (48% of the theoretical amount) of 4-chloro-7-methoxy tryptamine of Formula III are obtained.

The amino acid which has not undergone reaction is subjected to decarboxylation again. This operation is repeated two times and an overall yield (from starting Compound VI) of 81% is obtained. For purification said tryptamine compound is dissolved in methylene chloride and carbon dioxide gas is passed through the solution at +5° C. for 30 minutes. The precipitated N-(4-chloro-7-methoxy tryptamine) carboxylate of 4-chloro-7-methoxy tryptamine is filtered off, washed and dried. The compound melts at 115–120° C. with decomposition and 16.3 gm. are recovered (31%).

It is decomposed by suspending it in toluene and refluxing the suspension while passing nitrogen therethrough. On cooling with ice, filtering off the crystals, and washing them with toluene, 12.8 gm. (27% of pure 4-chloro-7-methoxy tryptamine are obtained. The new compound occurs in the form of colorless prismatic crystals and is soluble in ether and a mixture of toluene and cyclohexane and very soluble in alcohol. It melts at 156.5° C.

*Analysis.*—$C_{11}H_{13}ON_2Cl$; molecular weight: 224.68. Calculated (for a solvated compound containing 1.5% of cyclohexane): C, 59.32%; H, 5.89%; N, 12.58%. Found: C, 59.3%; H, 5.9%; N, 12.4%.

*Example IV*

PREPARATION OF 9-CHLORO-12-METHOXY DESERPIDINE

[I; X=Cl, Y=H, Z=OCH₃]

*Step A: The Methyl Ester of 18β-Acetoxy-9-Chloro-12,17α - Dimethoxy - 16β - Methoxy Carbonyl-2,3,3,4-Diseco-Δ⁴⁽²¹⁾,20α-Yohimbene-3-Carboxylic Acid (IX; X=Cl, Y=H, Z=OCH₃)*

15 gm. of levorotatory 1β-carboxy methyl-2β-methoxy carbonyl 3α-methoxy-4β-acetoxy-6β-formyl cyclohexane are suspended in 70 cc. of ether. After cooling in an ice bath, 150 cc. of a solution of diazomethane in methylene chloride are added within 10 minutes. The resulting homogeneous solution is allowed to stand in the ice bath for 10 minutes. The solvent is distilled off in a vacuum.

The residue is dissolved in 30 cc. of tetrahydrofuran. 7.5 gm. of 4-chloro-7-methoxy tryptamine, obtained according to Example III, are dissolved in 150 cc. of tetrahydrofuran by refluxing. The resulting solution is cooled to 20° C. and added to the solution of the aldehyde compound obtained from the previously described methylation reaction. The reaction mixture is allowed to stand at room temperature for 40 minutes and is then evaporated to dryness in a vacuum whereby care is taken that a temperature of 30° C. is not exceeded. The resulting resinous compound is used without further purification for the next reaction step.

*Step B: 9-Chloro - 12,17α - Dimethoxy - 18β - Hydroxy-16β - Carboxy - 3 - Oxo - 2,3 - Seco - 20α - Yohimbane (X; X=Cl, Y=H, Z=OCH₃)*

The resin obtained according to the preceding step is dissolved in 150 cc. of methanol. 3.5 gm. of potassium borohydride are added while stirring and maintaining the temperature at +30° C. for 10 minutes. The mixture is then heated under reflux for 15 minutes, cooled, and then treated with acetic acid until foaming ceases. 110 cc. of water and 60 cc. of sodium hydroxide solution are added. The mixture is heated under reflux for 15 minutes, cooled to +10° C., poured on 200 gm. of ice, and acidified by the addition of hydrochloric acid to a pH of 1.0. The mixture is extracted several times with methylene chloride containing 20% of methanol. The combined extracts are washed with water and dried over magnesium sulfate. On distillation to dryness, 15 gm. of the resinous yohimbane compound are obtained. The compound has not yet been described in the literature.

*Step C: Preparation of the Dextrorotatory 16,18-Lactone of 9 - Chloro - 18β - Hydroxy - 12,17α - Dimethoxy - 3-Oxo - 2,3 - Seco - 16β - Carboxy - 20α- Yohimbane (XII; X=Cl, Y=H, Z=OCH₃)*

15 gm. of the resinous 9-chloro-18β-hydroxy-12,17α-dimethoxy - 3 - oxo - 2,3 - seco - 16β - carboxy - 20α-yohimbane, prepared in Step B, is dissolved at elevated temperatures in a mixture of 150 cc. of acetic acid, 150 cc. of acetic acid anhydride and 7.5 gm. of lithium acetate. The reaction mixture is maintained for a period of 2 hours at 80° C. The reaction mixture is then cooled to 40° C., 100 cc. of water are added thereto, and the mixture is allowed to stand for 1 hour. It is next extracted with methylene chloride. The extracts are combined, washed with water, dried over magnesium sulfate and distilled to dryness under vacuum. The resinous residue taken up in ethyl acetate is crystallized. The mixture is iced, vacuum filtered and the crystals washed with ether. 11.2 gm. (being an overall yield of 71%) of the 16,18-lactone of 9-chloro-18β-hydroxy-12,17α-dimethoxy-3-oxo-2,3-seco-16β-carboxy-20α-yohimbane are recovered. This compound is directly utilizable for the next step of the synthesis. The lactone has a melting point of 190° C. and is soluble in chloroform, slightly soluble in ether and ethyl acetate and insoluble in water. It has a specific rotation $[\alpha]_D^{20} = +14°$ (c.=0.5% in pyridine).

Analysis.—$C_{22}H_{25}O_5N_2Cl$; molecular weight: 432.90. Calculated: C, 61.04%; H, 5.82%; O, 18.48%; N, 6.47%; Cl, 8.19%. Found: C, 61.1%; H, 5.8%; O, 18.3%; N, 6.2%; Cl, 8.4%.

The infrared spectrum confirmed the indicated structure. This compound is not described in the literature.

Step D: Preparation of the Dextrorotatory 16,18-Lactone of 9-Chloro-18β-Hydroxy-12,17α-Dimethoxy-16β$\Delta^{3(14)}$-20α-Yohimbene (XIV; X=Cl, Y=H, Z=$OCH_3$)

10.2 gm. of the 16,18-lactone of 9-chloro-18β-hydroxy-12,17α - dimethoxy - 3 - oxo - 2,3 - seco - 16β - carboxy-20α-yohimbane obtained according to Step C is cyclized at reflux in the presence of 100 cc. of phosphorus oxychloride. After 2 hours of refluxing the reaction mixture is distilled to dryness under vacuum. The residue is dissolved at 0° C. in 150 cc. of acetone and concentrated ammonia is added until the pH reaches 10. Then an excess of water is added. The mixture is extracted with methylene chloride. The extracts are combined, dried and distilled to dryness. The residue, comprising the 16,18-lactone of 9-chloro-18β-hydroxy-12,17α-dimethoxy-16β-carboxy-$\Delta^{3(14)}$-20α-yohimbene, crystallizes from methanol. 8 gm. (being a yield of 80%) of product are obtained. This product, which is new, is soluble in methylene chloride, very slightly soluble in methanol and insoluble in ether. Starting from a mixture of methylene chloride and methanol, a crystalline form other than that obtained from methanol alone is obtained. The product has a melting point of 190° C. and 225° C. and a specific rotation $[\alpha]_D^{20} = +8°$ (c.=0.5% in dimethylformamide).

Analysis.—$C_{22}H_{23}O_4N_2Cl$; molecular weight: 414.88. Calculated: C, 63.68%; H, 5.58%; N, 6.75%; Cl, 8.54%. Found: C, 63.8%; H, 5.5%; N, 6.4%; Cl, 8.7%.

Step E: Preparation of the α- and β-Isomers of the 16,18-Lactone of 9-Chloro-18β-Hydroxy-12,17α-Dimethoxy-16β-Carboxy-20α-Yohimbane A mixture of 350 cc. of acetic acid and 35 gm. of powdered zinc is heated to reflux under agitation and, over a period of 10 minutes, 8.4 gm. of the non-saturated lactone obtained in the preceding Step D are added. Refluxing is continued for a period of 5 minutes. Next the reaction solution is poured on 750 gm. of ice, neutralized by 450 cc. of amomnia water at +10° C. maximum and extracted several times with methylene chloride. The extracts are washed with water, dried and distilled to dryness. The residue, dissolved in methylene chloride, is passed through 350 gm. of alumina. There is recovered in all 3 gm. of crystalline substances. The first fraction weighs 1.120 gm., has a melting point of 180° C. and a specific rotation $[\alpha]_D^{20} = +35°$ (c.=0.5% in chloroform) and comprises an unidentified product. The second fraction weighs 0.820 gm. (25%), has a melting point of 170–180° C., a specific rotation $[\alpha]_D^{20} = +8°$ (c.=0.5% in chloroform) and is the 3β-isomer. The following fraction (20%) is the 3α-isomer having a melting point of 170–175° C. and a specific rotation $[\alpha]_D^{20} = -110°$ (c.=0.5% in chloroform). This last fraction is contaminated by a small amount of the 3β-isomer. The infrared spectra confirmed the structure of the two isomers. These compounds are new and not described in the chemical literature.

Step F: Preparation of the Levorotatory 16,18-Lactone of 9 - Chloro-18β - Hydroxy - 12,17α - Dimethoxy - 16β-Carboxy-3α,20α-Yohimbane To a solution containing 150 mg. of the non-saturated lactone obtained according to Step D, 5 cc. of anhydrous methanol and 0.15 cc. of concentrated hydrochloric acid, sodium borohydride is added by small fractions until the pH reaches 9 while maintaining the temperature at 5° C. After addition of water, the 3α-isomer crystallizes. The mixture is vacuum filtered and 140 mg. (being a yield of 90%) of the 16,18-lactone of 9-chloro-18β-hydroxy-12, 17α-dimethoxy-16β-carboxy-3α,20α-yohimbane is recovered. The crystals had a melting point of 170° C., a specific rotation $[\alpha]_D^{20} = -160°$ (c.=0.5% in chloroform) and were soluble in a mixture of methylene chloride and methanol and pure chloroform, and insoluble in ether. The infrared spectra is in accord with the indicated structure.

Step G: Preparation of the Dextrorotatory 16,18-Lactone of 9 - Chloro - 18β - Hydroxy - 12,17α- - Dimethoxy-16β-Carboxy-3β,20α-Yohimbane (XVI; X=Cl, Y=H, Z=$OCH_3$)

800 mg. of the 16,18-lactone of 9-chloro-18β-hydroxy-12,17α-dimethoxy-16β-carboxy-3α,20α-yohimbane either pure or containing a little of its 3β-isomer and having a melting point of 170–175° C. and a specific rotation $[\alpha]_D^{20} = -110°$ (c.=0.5% in chloroform) and prepared according to either Step E or F preceding, are heated to reflux with 4 cc. of technical formic acid for a period of 15 minutes. The solution is cooled and successively 4 gm. of ice and sufficient ammonia to raise the pH to 10 are added. The solution is next extracted with methylene chloride and the extracts are combined, washed, dried and distilled to dryness. A resin is obtained which is crystallized from methanol. After vacuum filtering, 600 mg. (being a yield of 75%) of a product melting at 160° C., then at 263° C., having a specific rotation $[\alpha]_D^{20} = -7°$ (c.=0.5% in chloroform) are recovered. This product comprises the 16,18-lactone of 9-chloro-18β-hydroxy-12,17α - dimethoxy - 16β - carboxy - 3β,20α - yohimbane contaminated by a small amount of a 3α-isomer. This product is utilized as such for the next step of the synthesis. For purification, it is dissolved in methylene chloride by boiling. The solution is filtered, added to methanol and concentrated. It crystallizes spontaneously while warm. The solution is iced and vacuum filtered. 470 mg. of prismatic crystals of the 3β-isomer are obtained having a slow melting point of 170–180° C. and 264° C. and a specific rotation $[\alpha]_D^{20} = +8°$ ±10° (c.=0.5% in chloroform).

Analysis.—$C_{22}H_{25}O_4N_2Cl$; molecular weight: 416.90. Calculated: C, 63.38%; H, 6.04%; O, 15.35%; N, 6.72%; Cl, 8.50%. Found: C, 62.8%; H, 6.0%; O, 15.6%; N, 6.7%; Cl, 8.3%.

Step H: Preparation of Levorotatory 9-Chloro-18β-Hydroxy - 12,17α-Dimethoxy - 16β - Methoxycarbonyl-3β, 20α-Yohimbane (XIX; X=Cl, Y=H, Z=$OCH_3$)

A mixture of 600 mg. of the 16,18-lactone of 9-chloro-18β-hydroxy - 12,17α - dimethoxy - 16β - carboxy-3β,20α-yohimbane obtained according to Step G, 24 cc. of methanol and 8 cc. of methanol containing 1 mg. of sodium per cc. is heated to reflux for a period of 2 hours. The solution is then concentrated under vacuum and successively acetic acid is added until a pH of 4 is reached and then ammonia until the pH reaches 10. The solution is next extracted with methylene chloride. The extracts are dried and distilled to dryness. The residue is triturated with ether and furnishes 440 mg. (being a yield of 70%) of crystals of 9-chloro-18β-hydroxy-12,17α-dimethoxy-16β-methoxycarbonyl-3β,20α-yohimbane having a melting point of 220° C. then 273° C. Another form is obtained by crystallization from a mixture of ethyl acetate and ether and melts at a temperature of 140–160° C. (solvate), then at 274° C.

This compound which is new is soluble in chloroform, slightly soluble in ethyl acetate and insoluble in ether and has a specific rotation $[\alpha]_D^{20} = -102°$ (c.=0.5% in chloroform).

Analysis.—$C_{23}H_{29}O_5N_2Cl$; molecular weight: 448.94. Calculated: C, 61.53%; H, 6.51%; N, 6.24%. Found: C, 61.6%; H, 6.5%; N, 6.3%.

The infrared spectra confirmed the indicated structure.

*Step I: Preparation of Levorotatory 9-Chloro-12-Methoxy-Deserpidine (I; X=Cl, Y=H, Z=OCH₃)*

A mixture containing 700 mg. of 9-chloro-18β-hydroxy-12,17α-dimethoxy - 16β - methoxycarbonyl-3β,20α-yohimbane obtained according to Step H, 7 cc. of pyridine and 1.75 gm. of 3,4,5-trimethoxy-benzoyl chloride is heated to 80° C. for a period of 16 hours. After cooling to 30° C., the reaction solution has added thereto 2 cc. of water and is allowed to stand at room temperature for a period of 45 minutes. The reaction solution is then poured on 10 gm. of ice, acidified to a pH of 1 by concentrated hydrochloric acid and extracted with methylene chloride. The extracts are washed with ammonia and with water, dried and distilled to dryness. The residue is taken up in ammonia. Water is added and a precipitate is formed which is separated by vacuum filtering. After drying, 830 mg. of an amorphous powder comprising 9-chloro-12-methoxy-deserpidine are obtained. The resulting 9-chloro-12-methoxy-deserpidine has not yet been described in the literature. It has a rotatory power of $[\alpha]_D^{20} = -132° \pm 10°$ (c.=0.25% in chloroform), is soluble in aqueous methanol and insoluble in ether.

Analysis.—$C_{33}H_{39}O_9N_2Cl$; molecular weight: 643.12. Calculated: C, 61.64%; H, 6.11%; O, 22.39%; N, 4.35%; Cl, 5.51%. Found: C, 61.5%; H, 6.1%; O, 22.5%; N, 4.2%; Cl, 5.6%.

EXAMPLE V

PREPARATION OF 6-CHLORO-7-METHOXY TRYPTAMINE
[III; X=H, Y=Cl, Z=OCH₃]

157.6 gm. of 3-chloro-o-anisidine are diazotized in dilute hydrochloric acid at a temperature between 0° C. and +5° C. by means of 88 gm. of sodium nitrite in 220 cc. of water. The solution of the potassium salt of 3-carboxy-2-piperidone, prepared by saponification of 171 gm. of 3-carbethoxy-2-piperidone by means of aqueous potassium hydroxide solution, is added at 0° C. to the solution of the diazonium salt. The pH value of the reaction mixture is adjusted to a pH of 4.0 by the addition of acetic acid. After stirring for 6 hours in an ice bath, the phenyl hydrazone compound of Formula VI is filtered with suction, washed with water, and dried. When cooling the mother liquors of the condensation reaction for a prolonged period of time, a second crop of phenyl hydrazone is obtained. The yield is 250 gm. of a crude product which is purified by dissolving it in ethanol by heating under reflux, filtering the solution while hot, and cooling the filtrate. 173 gm. (65% of the theoretical amount) of the pure phenyl hydrazone are obtained.

The 2,3-dioxo piperidine - 3-(3'-chloro - 2' - methoxy) phenyl hydrazone melts at 159° C. It is almost insoluble in water and soluble in hot ethanol.

Analysis.—$C_{12}H_{14}O_2N_3Cl$; molecular weight: 267.7. Calculated: C, 53.83%; H, 5.27%; O, 11.96%; N, 15.69%; Cl, 13.24%. Found: C, 53.9%; H, 5.4%; O, 12.2%; N, 15.7%; Cl, 13.4%.

This compound has not yet been described in the literature.

In order to cause ring closure, 27.7 gm. of said phenyl hydrazone are refluxed with 554 cc. of n-butanol for 3 hours, while passing gaseous hydrochloric acid through the solution. After cooling in an ice bath overnight, the yellowish-brown precipitate is filtered off with suction from the butanol.

In order to remove ammonium chloride from the crude hydrochloride of the resulting carboline compound of Formula VII, it is first triturated with a very small amount of butanol, filtered with suction, washed with isopropyl ether, and made up to a paste by mixing with a large excess of water. The color of the compound changes to a greenish grey. After filtration, washing with water, and drying, 11.8 gm. of a greenish powder are obtained as a first crop.

A second crop of crude material is obtained when adding to the mother liquors, the butanol and isopropyl ether wash liquors of the previous step, evaporating the mixture in a vacuum, and triturating the viscous residue with water. Thereby 15 gm. of a paste-like product are obtained as second crop. The two crops of crude material are purified by successive recrystallization from n-butanol and isopropanol while heating under reflux. Thereby, 10.82 gm. (42% of the theoretical amount) of 7-chloro-8-methoxy-1,2,3,4-tetrahydro-1-oxo-β - carboline of Formula VII are obtained, which has not yet been described in the literature, crystallizes in the form of small white needles which melt at 223–224° C. with decomposition and which are slightly soluble in ether and soluble in cold methanol and in hot isopropanol, ethanol, and butanol.

Analysis.—$C_{12}H_{11}O_2N_2Cl$; molecular weight: 250.68. Calculated: C, 57.49%; H, 4.42%; N, 11.18%; Cl, 14.14%. Found: C, 57.5; H, 4.5%; N, 11.4%; Cl, 14.1%.

In order to prepare 6-chloro-7-methoxytryptamine-2-carboxylic acid of Formula VIII, 250.7 gm. of said carboline compound are saponified by means of an alcoholic solution of 560 gm. of potassium hydroxide. The mixture is refluxed for 4 hours and the solvent is removed by evaporation to dryness in a vacuum. The residue is dissolved in water. After cooling in an ice bath and filtration, the solution is acidified by the addition of acetic acid to a pH valve of 4.0 to 5.0. The precipitated carboxylic acid is filtered with suction, triturated with water, again filtered, and dried in a vacuum. The yield is almost quantitative and the product is sufficiently pure for the next reaction step. For analytical purposes a small amount may be purified by recrystallization from hot water.

The 6-chloro-7-methoxy tryptamine-2-carboxylic acid melts at 317–318° C. with decomposition and is soluble in hot water and insoluble in alcohol, ether, acetone, benzene and chloroform.

Analysis.—$C_{12}H_{13}N_2O_3Cl$; molecular weight: 268.7. Calculated: C, 53.64%; H, 4.87%; O, 17.86%; N, 10.43%; Cl, 13.19%. Found: C, 53.5%; H, 4.9%; O, 17.2%; N, 10.2%; Cl, 13.6%.

The hydrochloride of 6-chloro-7-methoxy tryptamine-2-carboxylic acid is prepared by dissolving the amine in hydrochloric acid while heating; it melts at 265° C.

In order to split off the carboxyl group of said compound, 6 gm. thereof are dissolved in 10 parts by volume of acetic acid. The mixture is heated to 90° C. and 10 parts by volume of hydrochloric acid are added, whereby the amino carboxylic acid precipitates. The mixture is refluxed for 4 hours while stirring. After cooling to 5° C. the solution is filtered and rendered alkaline by the addition of aqueous sodium hydroxide solution. It is extracted several times with ether. The extracts are washed with a saturated solution of sodium chloride, dried over sodium sulfate, and evaporated to dryness. The yield of 6-chloro-7-methoxytryptamine of Formula III is 3.115 gm. (62% of the theoretical amount). For analytical purposes the compound is recrystallized successively from benzene and hot cyclohexane.

6-chloro-7-methoxy tryptamine, which has not yet been described in the literature, has a melting point at 113.5° C. and crystallizes in the form of colorless needles which are soluble in benzene and alcohol and very slightly soluble in water.

Analysis.—$C_{11}H_{13}ON_2Cl$; molecular weight: 224.68. Calculated: C, 58.80%; H, 5.83%; O, 7.12%; N, 12.47%; Cl, 15.78%. Found: C, 59.0%; H, 5.9%; O, 7.3%; N, 12.2%; Cl, 15.7%.

Example VI

PREPARATION OF LEVOROTATORY 11-CHLORO-12-METHOXY DESERPIDINE

[I; X=H, Y=Cl, Z=OCH₃]

*Step A: The Methyl Ester of 18β-Acetoxy-11-Chloro-12, 17α-Dimethoxy-16β-Methoxy-Carbonyl-2,3-3,4-Diseco-$\Delta^{4(21)}$,20α-Yohimbene-3-Carboxylic Acid (IX; X=H, Y=Cl, Z=OCH₃)*

2 gm. of dextrorotatory (in pyridine) 1β-carboxy methyl-2β-methoxy carbonyl-3α-methoxy-4β-acetoxy-6β-formyl cyclohexane are dissolved in 20 cc. of methylene chloride and are methylated by means of diazomethane. After concentration of the reaction mixture in a vacuum to a volume of 20 cc., 1.09 gm. of 6-chloro-7-methoxy tryptamine, prepared according to Example V, are added to the solution of the resulting methyl ester. The reaction mixture is allowed to stand at room temperature for 15 minutes. The resulting solution of the desired new methyl ester is used without further purification for the next reaction step.

*Step B: 11-Chloro-18β-Hydroxy-12,17α-Dimethoxy-16β-Methoxy Carbonyl-3-Oxo-2,3 - Seco - 20α - Yohimbane (XI; X=H, Y=Cl, Z=OCH₃)*

20 cc. of methanol are added to the solution of the methyl ester prepared according to the preceding step. The temperature of the solution is maintained at 5° C. 0.55 gm. of potassium boro hydride are added thereto while stirring. Thereby, the temperature of the reaction mixture is maintained at 5° C. for 10 minutes and at 20° C. for the following 10 minutes. Methylene chloride is removed by distillation from the reaction mixture and the remaining solution is refluxed for 1 hour. After addition of a few cc. of water, the pH value of the mixture is adjusted to a pH of 1.0 by the addition of hydrochloric acid. More water is added and the mixture is extracted with methylene chloride. The extracts are washed successively with a sodium bicarbonate solution and water, dried, and evaporated to dryness. 1.8 gm. of crude 11-chloro-18β-hydroxy-12,17α-dimethoxy-16β-methoxy carbonyl-3-oxo-2,3-seco-20α-yohimbane are obtained. The new compound may be used without further purification for the next reaction step.

*Step C: Preparation of Dextrorotatory 18β-Acetoxy-11-Chloro - 12,17α - Dimethoxy-16β-Methoxy Carbonyl-3-Oxo - 2,3-Seco-20α-Yohimbane (XIII; X=H, Y=Cl, Z=OCH₃)*

1.8 gm. of the compound obtained according to Step B is dissolved in 7.5 cc. of pyridine. 4.5 cc. of acetic acid anhydride are added and the solution heated to 70° C. for a period of 15 minutes. The solution is distilled to dryness under vacuum and the residue is crystallized from a mixture of ethyl acetate and ether. The crystals are vacuum filtered and washed by ether. A yield of 1.75 gm. (71% based on the amount of tryptamine utilized in Step A) of 18β-acetoxy-11-chloro-12,17α-dimethoxy-16β-methoxy carbonyl 3-oxo-2,3-seco-20α-yohimbane are obtained. This product, which is present in the form of yellowish, clear prismatic crystals, is soluble in acetone, methylene chloride and ethyl acetate, insoluble in water and ether, has a melting point of 188° C. and a specific rotation $[\alpha]_D^{20}=+10° \pm 5°$ (c.=0.5% in pyridine).

Analysis.—$C_{25}H_{31}O_7N_2Cl$; molecular weight: 506.98. Calculated: C, 59.22%; H, 6.16%; N, 5.52%; Cl, 6.99%. Found: C, 59%; H, 6%; N, 5.4%; Cl, 7.4%.

The infrared spectra is in accord with the indicated structure. The compound has not been described in the literature.

*Step D: Preparation of Levorotatory in Pyridine 18β-Acetoxy - 11-Chloro-12,17α-Dimethoxy-16β-Methoxy Carbonyl - $\Delta^{3(4)}$ - 20α - Yohimbene (XV; X=H, Y=Cl; Z=OCH₃)*

1.75 gm. of the compound obtained according to Step C is heated to reflux for a period of 2 hours in 4 cc. of phosphorus oxychloride. The reaction mixture is next distilled to dryness. The residue is taken up in acetone and while cooling, first ammonia solution is added then water. The product, 18β-acetoxy-11-chloro-12,17α-dimethoxy - 16β - methoxy carbonyl-$\Delta^{3(14)}$-20α-yohimbene, crystallizes. The crystals are vacuum filtered, washed with water and with methanol, dried and 1.50 gm. (89%) of clear brown crystals are recovered. The crystals are soluble in chloroform, slightly soluble in alcohol, insoluble in ether and have a melting point of 290° C. and a specific rotation $[\alpha]_D^{20}=-23° \pm 5°$ (c.=0.5% in pyridine).

The infrared spectra confirms the indicated structure. The compound is not described in the literature.

*Step E: Preparation of the Levorotatory in Pyridine 18β-Acetoxy-11-Chloro-12,17α-Dimethoxy - 16β - Methoxy Carbonyl-3α,20α-Yohimbane*

In a solution containing 50 mg. of the unsaturated compound obtained according to Step D, 1.5 cc. of methanol and several drops of hydrochloric acid, sodium boro hydride is introduced by small fractions until the solution is decolorized. The 18β - acetoxy-11-chloro-12,17α-dimethoxy-16β-methoxy carbonyl-3α,20α-yohimbane crystallizes. 3 cc. of water are added to the suspension and the suspension is allowed to stand for several minutes. The crystals are vacuum filtered and dried. 45 mg. (90%) of a product melting at 231° C. and 260° C. and having a specific rotation $[\alpha]_D^{20}=-153° \pm 5°$ (c.=0.5% in pyridine), are obtained. This compound, in the form of white prismatic crystals, is soluble in chloroform, slightly soluble in acetone and insoluble in water and ether. The infrared spectra is in accord with the indicated structure and confirms in particular that the 3α-isomer was obtained.

The compound is not described in the literature.

*Step F: Preparation of Levorotatory in Pyridine 18β-Acetoxy - 11-Chloro-12,17α-Dimethoxy-16β-Methoxy Carbonyl - 3β,20α - Yohimbane (XVII; X=H, Y=Cl, Z=OCH₃)*

A solution of 1.80 gm. of 18β-acetoxy-11-chloro-12,17α-dimethoxy - 16β-methoxy carbonyl-$\Delta^{3(14)}$-20α-yohimbene obtained according to Step D in 36 cc. of acetone and 36 cc. of 20% perchloric acid is prepared. 3.6 gm. of powdered zinc is introduced therein. The reaction mixture is agitated for a period of 2 hours at room temperature. The zinc is removed by vacuum filtering and the solution is neutralized with ammonia. The solution is extracted with methylene chloride. The extracts are combined, dried and evaporated to dryness. The residue is taken up in acetone and 18β-acetoxy-11-chloro-12,17α-dimethoxy - 16β-methoxy carbonyl-3β,20α-yohimbane crystallizes. The product has a melting point of 311° C. and was obtained in a yield of 750 mg. (41%).

It is practically free of the 3α-isomer described in Step E. It is purified by recrystallization from the same solvent. The new compound which is not described in the literature occurs in the form of white prismatic crystals and is soluble in chloroform, very slightly soluble in acetone and insoluble in water and ether. It has a specific rotation $[\alpha]_D^{20}=-129° \pm 5°$ (c.=0.5% in pyridine).

Analysis.—$C_{25}H_{31}O_6N_2Cl$; molecular weight: 490.98. Calculated: C, 61.15%; H, 6.36%; N, 5.71%; Cl, 7.23%. Found: C, 61.1%; H, 6.5%; N, 5.6%; Cl, 7.6%.

The infrared spectra is characteristic of the indicated structure and shows the absence of the 3α-isomer.

*Step G: Preparation of the Levorotatory in Pyridine 11-Chloro - 18β-Hydroxy-12,17α-Dimethoxy-16β-Methoxy-carbonyl - 3β,20α - Yohimbane (XIX; X=H, Y=Cl, Z=OCH₃)*

1.17 gm. of the 3β-isomer obtained according to Step F preceding are mixed with 47 cc. of methanol and 4.7 gm. of potassium borohydride. The mixture thus obtained is heated to reflux for a period of 2½ hours and next concentrated to a volume of 10 cc. The 11-chloro-18β-hydroxy-12,17α-dimethoxy-16β-methoxycarbonyl-3β,20α-yohimbane crystallizes. 5 cc. of 50% aqueous methanol are added. The crystals are vacuum filtered, washed with aqueous methanol and dried. 750 mg. (70%) of the 18β-hydroxy product are recovered having a melting point of 140° C. and 160° C. and a specific rotation $[\alpha]_D^{20} = -86°$ (c.=0.5% in pyridine). The crystals are present in the form of nearly colorless crystals having 7% solvation. They are soluble in acetone, chloroform and methanol and insoluble in water.

Analysis.—$C_{23}H_{29}O_5N_2Cl$; molecular weight: 449. Calculated: C, 61.52%; H, 6.51%. Found: C, 61.6%; H, 6.5%.

The infrared spectra is in accord with the indicated structure. The compound is not described in the literature.

*Step H: Preparation of the Levorotatory in Chloroform 11-Chloro-12-Methoxy Deserpidine (I; X=H, Y=Cl, Z=OCH₃)*

530 mg. of 3,4,5-trimethoxy-benzoyl chloride and 2.3 cc. of pyridine are added to 230 mg. of 11-chloro-18β-hydroxy-12,17α-dimethoxy-16β-methoxycarbonyl-3β,20α-yohimbane obtained according to Step G. The reaction mixture is heated to 75° C. for a period of one night and 1 cc. of water is next added thereto. The mixture is agitated and allowed to stand 1½ hours at a temperature of 50° C. The mixture is extracted with methylene chloride. The extracts are washed with hydrochloric acid, with ammonia and finally with water. After distillation to dryness, the residue is crystalized from aqueous methanol. A yield of 150 mg. (51%) of 11-chloro-12-methoxy deserpidine are obtained having a melting pointing of 183° C. and a specific rotation $[\alpha]_D^{20} = -129°\pm5°$ (c.=0.5% in chloroform). The 11-chloro-12-methoxy deserpidine obtained is a new compound, soluble in acetone, chloroform and methanol, insoluble in ether and water, and recrystallizable in aqueous acetone. It is a hydroscopic product.

Analysis.—$C_{33}H_{39}O_9N_2Cl$; molecular weight=643.12. Calculated: C, 61.63%; H, 6.11%; Cl, 5.51%. Found: C, 60.9%; H, 6.1%; Cl, 6.0%.

The infrared spectra is in accord with the indicated structure.

While, as has been pointed out hereinabove, the various new compounds of the reserpine series according to Formula I have a high hypotensive effect and are useful in therapy, the tryptamine compounds according to the present invention are, in general, important intermediates in the manufacture of such compounds of the reserpine series. In addition thereto, they also possess very surprising physiological properties inasmuch as they act as antimetabolites to tryptophan. The following experiment proves such antimetabolitic activity of said tryptamine compounds.

A culture medium of the following composition was provided:

1.5 gm. of heart extract
1.5 gm. of yeast autolysate
5.0 gm. of casein peptone
3.5 gm. of sodium chloride
3.68 gm. of dipotassium phosphate
1.32 gm. of mono-potassium phosphate
2.0 gm. of potassium nitrate, and
1.0 gm. of glucose are dissolved in water and the solution is made up to 1000 cc.

Said culture medium is distributed under sterile conditions in flasks at a rate of 30 cc. per flask. An amount of tryptophan corresponding to 0.2 gm./l. is added to each flask and then an amount of the compound to be tested corresponding to 0.01 gm./l. to 1.0 gm./l. The thus prepared flasks are inoculated with *Escherichia coli* (strain ATCC 11,105). The inoculated culture flasks are incubated at 37° C. for 48 hours while shaking on a shaking device. Thereafter, the indole formed during such incubation is determined by following the technique described by L. H. Chernoff in "Ind. Eng. Chem., Analytical Edition," vol. 12, page 273 (1940). Of course, only such cultures are tested in which normal growth of the microorganism took place. The following table shows the amount, in gm./l., of the compound to be tested which completely inhibits indole formation.

TABLE

| Compound: | Inhibiting amount |
|---|---|
| 4-chloro-7-methoxy tryptamine | 0.10 |
| 6-chloro-7-methoxy tryptamine | 0.08 |
| 6,7-dichloro tryptamine | 0.01 |

Corresponding tests were carried out with pathogenic strains of *Escherichia coli* as found in hospitals. Said tests confirmed the above given indole formation inhibiting effect of the tryptamine compounds used as intermediates in the process according to the present invention.

Of course, many changes and variations in the starting materials used, the reaction conditions, reaction temperature and duration, the solvents employed, the methods used for isolating and purifying the intermediate and final reaction products, and the like, may be used by those skilled in the art in accordance with the principles set forth herein and in the claims annexed hereto.

We claim:
1. A 20α-yohimbane compound of the formula:

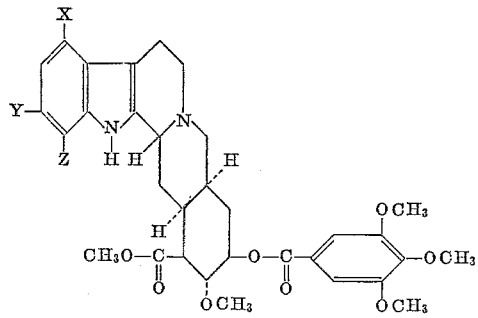

wherein X and Y are substituents different from each other and selected from the group consisting of hydrogen and chlorine and Z is methoxy.
2. 9-chloro-12-methoxy deserpidine.
3. 11-chloro-12-methoxy deserpidine.

References Cited in the file of this patent
UNITED STATES PATENTS

| 2,857,385 | Kuehne | Oct. 21, 1958 |
| 2,912,436 | Weisenborn | Nov. 10, 1959 |
| 2,929,817 | Joly et al. | Mar. 22, 1960 |
| 2,943,093 | Joly et al. | June 28, 1960 |

OTHER REFERENCES

Eiter et al.: Monatshefte für Chemie, vol. 81 (1950), pp. 404–413.

Vane: British Jour. of Pharmacology, vol. 14 (1959), pages 87, 90 and 91.